INVENTOR.
JOHN A. HOFFMAN

United States Patent Office

3,395,760
Patented Aug. 6, 1968

3,395,760
AERODYNAMICALLY FEATHERED HELICOPTER ROTOR
John A. Hoffman, 7350 Atoll Ave., Unit 21, North Hollywood, Calif. 91605
Filed Aug. 18, 1967, Ser. No. 661,676
4 Claims. (Cl. 170—135.4)

ABSTRACT OF THE DISCLOSURE

A rotor blade for a helicopter, the blade having a flexible shaft and aerodynamic means for its control. The control means includes a jet tab system attached to the rotor blade in a position to feather the blade and thus provide control for cyclic pitch change and controlled pitch change of the blade without complex mechanical linkages.

---

This invention pertains to helicopter rotors and more particularly to a helicopter rotor having a pitch control of each blade operable by aerodynamic means.

Previous helicopter rotors have required that the necessary cycle pitch change during rotation, as well as the controlled pitch changes for maneuvering, be accomplished by mechanical means. Ordinarily this has meant complex linkages, hinges, cams and the like. Hydraulic systems have also been suggested, but these also have necessitated many complicated mechanical components for their operation.

By my invention, I provide a system usable on all helicopters by which the rotor blade pitch changes can be accomplished efficiently and without complex mechanical systems. The result is a less complex and therefore less expensive helicopter. Furthermore, the device is simple enough so that repair and maintenance labor and therefore, cost should also be appreciably lessened.

A more complete understanding of my invention in its embodiment may be had from a study of the following specification and the figures in which.

Figure 1:
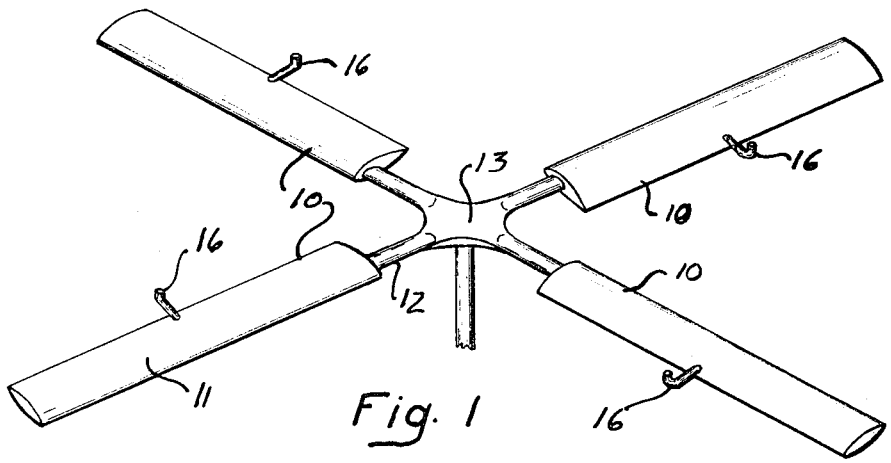
FIGURE 1 is a pictorial view of one embodiment of my invention.

Briefly my invention comprises a helicopter rotor system having a plurality of blades. Each blade is controlled by an aerodynamically operated control device or tab attached to the rotor.

More specifically and referring to the figures, my device consists of a helicopter rotor including a plurality of blades 10. I prefer to use four blades because a two bladed rotor causes an excess of vibrations and either an odd number or more than four adds to the complexity of the rotor system.

Each blade includes an airfoil portion 11 having a central spar 12. The spar 12 extends across the hub 13 and is continuous with the spar of the opposite airfoil 11. A power driven shaft 14 is attached to the hub 13 and transmits the power to rotate the rotor in flight.

Control of the helicopter as well as its stability is accomplished by changing of the pitch of the airfoil portions 11 of the blades of the rotor. My invention as shown in the embodiment of FIGURE 1 accomplishes this by use of a jet nozzle 16. This nozzle is attached to the trailing edge of the airfoil portion 11 of each rotor. Air (or any other jet fluid) is conducted to the nozzle through the ducting provided by a hollows shaft 14 and a hollow spar 12. Since each blade must be controlled individually, there must be a separate duct through the shaft 14 to each blade. In this embodiment, it is necessary only to conduct the fluid from the spar 12 to the nozzle 16 in order to get the jet effect necessary.

It will be obvious that the jet could be directed either upward or downward depending on which way the airfoil was initially set. If it were set at a low pitch and the nozzle was supported to increase the pitch, the jet would be directed upward. The reaction to the operation of the jet would then force the trailing edge downward to increase the pitch. It will also be obvious that the distance of the nozzle 16 from the trailing edge could be greater to achieve a greater twisting moment about the spar if desired.

Figure 2:
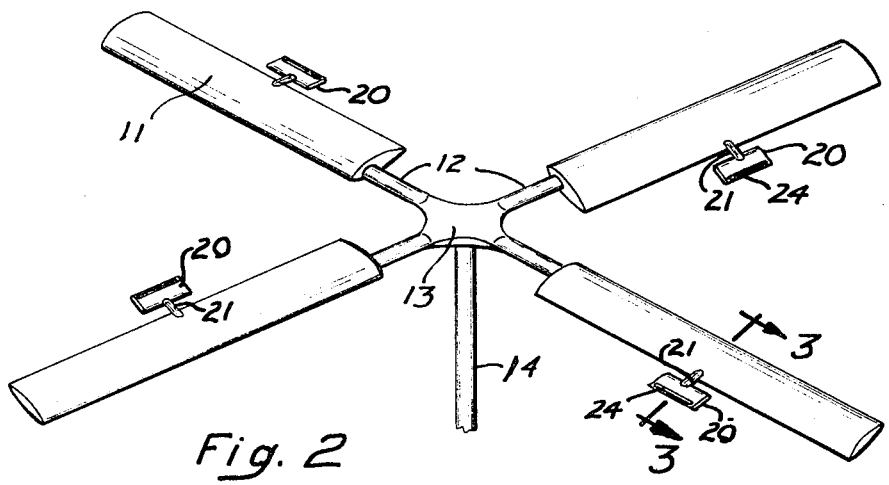
FIGURE 2 is a view similar to FIGURE 1 of a preferred embodiment of my invention.
Figure 3:
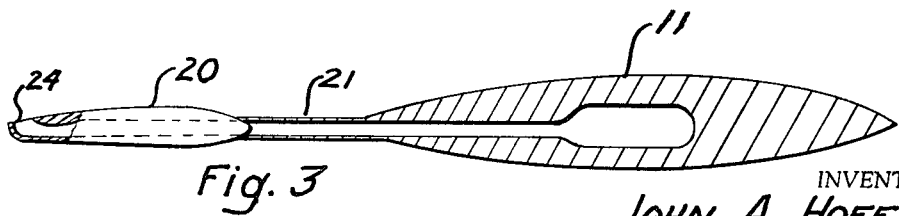
FIGURE 3 is an enlarged sectional view along a line 3—3 of FIGURE 2.

Even with a larger twisting moment arm, I have discovered the jet to be a relatively inefficient control means. Therefore, I prefer to use the embodiment of my invention shown in FIGURES 2 and 3. This embodiment involves the use of a jet tab rather than a pure jet or nozzle. The tab consists of a small airfoil 20 attached to the blade. It will be apparent that this airfoil may be attached either to the leading or trailing edge although I show it attached at the trailing edge. This airfoil is mounted so as to raise or lower the trailing edge of the blade, again dependent on which way the rotor blade is biased. I prefer to use the tab to raise the trailing edge, but the opposite effect is also possible.

The airfoil 20 is operably connected to the hollow spar 12 by means of a tube 21. This tube may also provide the structural connection of the tab to the airfoil portion 11 of the rotor blade. It will be apparent that the lift on the tab will operate to raise the trailing edge of the rotor blade and thus reduce the pitch. Therefore, in order to control the pitch of the rotor blade, it is necessary only to control the lift on the tab. I accomplish this by use of a stream of air from the trailing edge of the airfoil tab.

The tab 20 is formed to provide a slotted opening 24 or a series of openings along its upper trailing edge. By ejecting a fluid such as air, from these openings, the lift on the tab may be varied, therefore, it is apparent that by controlling the airflow from the trailing edge of the tab, or in other words, through the spar 12, I can control the pitch of the blade. The usual controls may now be interconnected with suitable valves or the like to control this airflow.

I have discovered that in my preferred embodiment, the centrifugal force on the air column within the blade generated by rotation of the blades is sufficient to provide airflow enough for the necessary control. However, it is envisioned that compressed air from some other source may be used if necessary or desirable.

It will be evident that with either embodiment, the spar 12 must be sufficiently flexible to allow some twisting so that the pitch can be changed. This flexibility may be built into the spar 12 through its design, or may be provided by mechanical means such as telescoping tubes which are able to turn against restraints mechanically introduced—such as by springs. I prefer to use a naturally flexible spar, but recognize that there are some structural problems, and therefore also recognize that there are alternative means for accomplishing the desired flexibility.

For many reasons, including the velocity of air flow over the tab to generate lift, the necessary pumping action of the air in the spar, and the flexibility of the spar, I prefer to locate the tab well out on the blade. I have discovered that a point from one-half to three-quarters of the radius from the hub is the most effective location of the tab.

Having thus described my invention in two embodiments thereof, I am aware that numerous and extensive departures may be made therefrom without departing from the spirit and scope of the invention as limited only by the following claims.

I claim:
1. An aerodynamic rotor comprising a plurality of blades interconnected together, said blades being affixed to a shaft at a hub portion, said blades and hub being formed to provide ducts through which fluid can be pumped, each of said blades having an airfoil portion, tab means fixed to each of said blades at a position spaced from the center of said airfoil portion, means conducting said fluid to said tab means, said tab means being formed to provide discharge openings for said fluid whereby the lift on said tab is variable by control of said fluid.

2. In an aerodynamic rotor including a shaft and rotor blades having hollow spars connected to said shaft; means for varying the pitch of said blades including an airfoil shaped tab attached to said blade at a position spaced laterally from the center of said blade, duct means in said blade and attached to said tab whereby fluid can be pumped through said duct means to said tab, said tab being formed to provide discharge means whereby the lift on said tab can be varied by varying the rate of discharge of said fluid.

3. The device of claim 2 in which said tab is fixed to said blade at a point between one-half and three-fourths of the distance from the hub to the outer end of said blade.

4. The device of claim 2 in which said tab is formed to provide openings therein, said openings being positioned to discharge said fluid to control the lift on said tab.

References Cited

UNITED STATES PATENTS

| | | | |
|---|---|---|---|
| 2,818,122 | 12/1957 | Johnston | 170—135.4 |
| 2,951,544 | 9/1960 | Kaman | 170—160.24 |
| 2,994,384 | 8/1961 | Stevens | 170—135.4 |
| 3,144,907 | 8/1964 | Lubben et al. | 170—160.25 |

EVERETTE A. POWELL, JR., *Primary Examiner.*